United States Patent
Igarashi et al.

(10) Patent No.: US 6,947,602 B2
(45) Date of Patent: Sep. 20, 2005

(54) IMAGE PROCESSING METHOD, APPARATUS, AND STORAGE MEDIUM

(75) Inventors: Susumu Igarashi, Kanagawa (JP); Tetsuya Tateno, Kanagawa (JP); Makoto Satoh, Tokyo (JP); Yukio Chiba, Kanagawa (JP); Katsumi Otsuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 699 days.

(21) Appl. No.: 10/021,247

(22) Filed: Dec. 19, 2001

(65) Prior Publication Data

US 2002/0090142 A1 Jul. 11, 2002

(30) Foreign Application Priority Data

Dec. 19, 2000 (JP) .......................................... 2000-385940
Dec. 13, 2001 (JP) .......................................... 2001-380508
Dec. 13, 2001 (JP) .......................................... 2001-380510

(51) Int. Cl.$^7$ ................................................. G06K 9/36
(52) U.S. Cl. ....................................................... 382/235
(58) Field of Search ................................. 382/232–253; 375/240–241

(56) References Cited

U.S. PATENT DOCUMENTS

| | | | |
|---|---|---|---|
| 5,402,248 A | 3/1995 | Sato et al. ................... 358/426 |
| 5,469,273 A | 11/1995 | Demura ....................... 382/244 |
| 5,699,117 A | * 12/1997 | Uramoto et al. .......... 348/390.1 |
| 5,751,233 A | 5/1998 | Tateno et al. ................ 341/67 |
| 5,812,146 A | 9/1998 | Sato et al. .................... 345/501 |
| 5,812,907 A | 9/1998 | Itoh et al. ..................... 399/87 |
| 5,848,194 A | 12/1998 | Ishizuka et al. ............ 382/234 |
| 5,852,467 A | * 12/1998 | Ogino ....................... 348/231.1 |
| 5,861,892 A | 1/1999 | Sato et al. ................... 345/435 |
| 6,104,754 A | * 8/2000 | Chujoh et al. .......... 375/240.23 |
| 6,313,767 B1 | 11/2001 | Ishizuka et al. .............. 341/67 |
| 6,317,461 B1 | * 11/2001 | Chujoh et al. .......... 375/240.23 |
| 6,782,368 B2 | * 8/2004 | Fujii et al. ................... 704/500 |
| 6,870,833 B2 | * 3/2005 | Schwartz ..................... 370/353 |

* cited by examiner

Primary Examiner—Jingge Wu
(74) Attorney, Agent, or Firm—Fitzpatrick, Cella, Harper & Scinto

(57) ABSTRACT

Whether a header information processor quickly enters a program inactive state at the timing when it issues an operation start command of an encoding process for a predetermined processing unit to a variable-length code encoder, or the header information processor enters the program inactive state upon completion of execution steps to be processed is adaptively selected in accordance with the number of execution steps. One memory is shared by the header information processor and variable-length code encoder, and address input permission means for controlling to grant permission of an address input to the memory to one of the header information processor and the variable-length code encoder is provided. The memory is used as a work area of the header information processor, and as a storage area of a variable-length code table which is looked up by the variable-length code encoder.

8 Claims, 13 Drawing Sheets

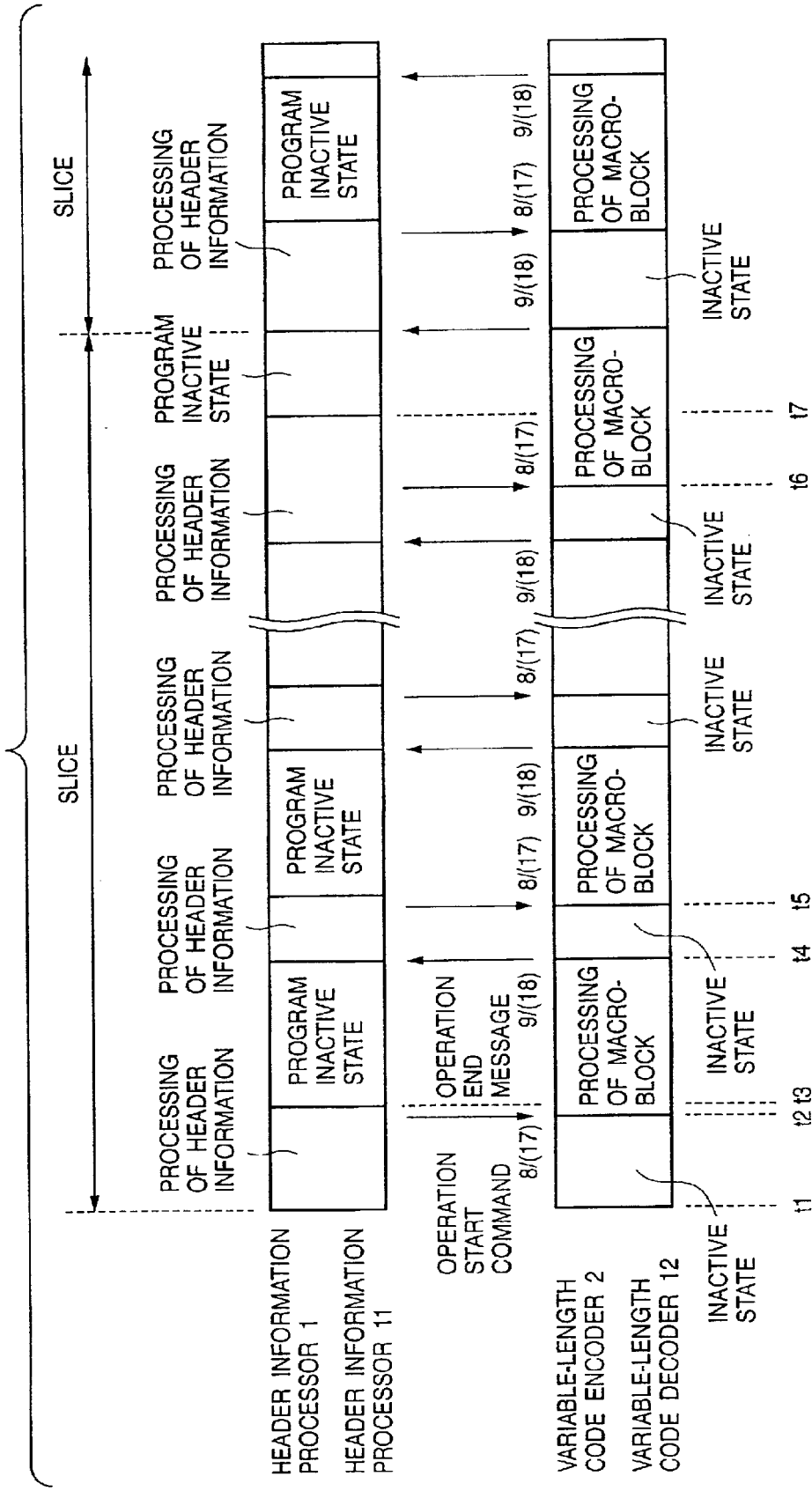

IMAGE PROCESSING METHOD, APPARATUS, AND STORAGE MEDIUM

FIELD OF THE INVENTION

The present invention relates to an image processing method, image processing apparatus, and storage medium for performing digital image encoding that compresses a digital image signal or digital video signal into an encoded data stream by encoding, and recording, storing, or transferring the compressed data sequence, and an image processing method, image processing apparatus, and storage medium for performing digital image decoding that decompresses the encoded data stream by decoding so as to reconstruct a digital image signal or digital video signal.

BACKGROUND OF THE INVENTION

Many digital cameras and digital video camcorders are commercially available. Some of these cameras and camcorders comprise encoding and decoding processing means for a plurality of coding schemes like a digital camera that can capture and record a moving image by switching photographic modes, or a digital video camcorder that can shoot and record a still image by switching photographic modes. In general, different coding schemes have different encoded data stream syntaxes. Also, encoded data streams processed by many coding schemes are formed by a mixture of both variable- and fixed-length codes.

Information contained in an encoded data stream is roughly categorized into two kinds of information. One type of information is so-called header information represented by common encoding parameters for the whole video sequence or different encoding parameters for respective pictures. The other type of information is image information itself. The header information may be partially formed by a variable-length code word, but is basically formed by a series of a plurality of fixed-length codes. On the other hand, the image information is a principal element that forms an encoded data stream, and is mainly formed by a series of a plurality of variable-length codes in consideration of high encoding efficiency.

In order to process (encode or decode) such general encoded data stream that includes both fixed- and variable-length codes at high speed, an encoding or decoding processing apparatus is known that independently comprises a processor that exclusively processes header information and a processor that exclusively processes image information, and operates these two processors in tandem with each other.

When a decoding process, for example, is done by such apparatus, the header information processor is always active (also, a program is running) even during a period in which a variable-length code decoder decodes a series of orthogonal transformation coefficient sequences so as to advance processing anywise, thereby shortening the time required for the overall decoding process compared to a case wherein the header information processor stands by in an inactive state. Note that orthogonal transformation means conversion between spatial domain and frequency domain. The same applies throughout the following description.

However, in general, there are not so many processes that the simultaneously operating header information processor should or must advance during the period in which the variable-length code decoder decodes a series of orthogonal transformation coefficient sequences as a processing unit.

An arithmetic operation required for a motion vector reconstruction process as a typical process of the header information processor can be done by a very small number of execution steps, and the header information processor, which has completed a series of processes instructed in advance by a program, normally repeats an idle routine in which it waits for only an interrupt by an end message signal of the decoding process from the variable-length code decoder.

Of course, when the current processing unit to be decoded is located at a hierarchically special position of a syntax like at a boundary of slice layers, or when various compensation operations for code errors detected in an encoded data stream are executed, relatively heavy processes are required for the header information processor. Electric power that the header information processor, which repeats the idle routine, consumes in the interrupt input wait state, is not negligible, if a system which comprises that decoding processing apparatus places an importance on portability.

In general, an interrupt service process of the header information processor requires a predetermined number of execution steps when the processor enters the interrupt service routine and returns to the previous routine, respectively. In a system such as an image encoding or decoding processing apparatus in which the number of times of interrupt events per unit time is relatively large, the total overhead upon executing the interrupt service process is not negligible, neither.

The header information processor uses a randomly accessible memory as a work area to save register values upon calling functions in a program, and to store constants to be used frequently and variables to be used temporarily. On the other hand, a variable-length code encoding or decoding processor executes a variable-length encoding or decoding process by looking up a variable-length code table stored in a memory. In this case, the memory that stores the variable-length code table, and that which is used as a work area of the header information processor are independent memories, and the whole system requires a total of memory sizes required for these memories, resulting in poor memory use efficiency.

Since the variable-length code table generated by the header information processor is written in a memory of the variable-length encoder or decoder via a bus or the like that connects them, a plurality of cycles are required to write data corresponding to one code. For example, since a Huffman code table for AC coefficients for one image component specified by the JPEG encoding recommendation has as many as 162 elements, the total number of cycles required to write these elements in the memory while consuming a plurality of cycles per element is not negligible.

SUMMARY OF THE INVENTION

The present invention has been made in consideration of the above situation, and has as its object to avoid unnecessary endless operations of the header information processor that has issued an operation start command of an encoding or decoding process for a predetermined processing unit to a variable-length code encoder or decoder without prolonging the total processing time, and to minimize power consumption of the whole system.

The present invention also has as its object to avoid inefficient use of memories by preparing a memory for storing the variable-length code table and that used as the work area of the header information processor as independent memories and to reduce the number of cycles required to write elements in the variable-length code table.

According to the present invention, the foregoing object is attained by providing an image processing method comprising an image data conversion step of generating an encoding parameter and a series of orthogonal transformation coefficient sequences from input source image data, a header information processing step of forming header information to be contained in an encoded data stream on the basis of the encoding parameter, a variable-length code encoding step of generating image information consisting of a series of a plurality of variable-length codes to be contained in the encoded data stream by sequentially encoding the series of orthogonal transformation coefficient sequences, an instruction step of issuing an operation start command of an encoding process for the series of the plurality of variable-length codes from the header information processing step to the variable-length code encoding step, a first control step of controlling the header information processing step to enter an operation inactive state at an predetermined timing after the operation start command of the encoding process was issued, a notification step of sending an operation end message of the encoding process for the series of orthogonal transformation coefficient sequences from the variable-length code encoding step to the header information processing step, and a second control step of controlling the header information processing step in the operation inactive state to resume an active state in response to the operation end message of the encoding process.

According to the present invention, the foregoing object is also attained by providing an image processing method comprising an image data conversion step of generating an encoding parameter and a series of orthogonal transformation coefficient sequences from input source image data, a header information processing step of forming header information to be contained in an encoded data stream on the basis of the encoding parameter, a variable-length code encoding step of generating image information consisting of a series of a plurality of variable-length codes to be contained in the encoded data stream by sequentially encoding the series of orthogonal transformation coefficient sequences, a first address input step of inputting address information to a storage device in the header information processing step, a second address input step of inputting address information to the storage device in the variable-length code encoding step, and an address information selection step of selecting the address information input in one of the first and second address input steps, and allowing to input the selected address information to the storage device.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 3 is a first timing chart showing the operation mode of the image encoding and decoding apparatuses of the present invention;

DETAILED DESCRIPTION OF THE PREFERRED EMBODIMENTS

Preferred embodiments of the present invention will be described in detail in accordance with the accompanying drawings.

[First Embodiment]

Figure 1:
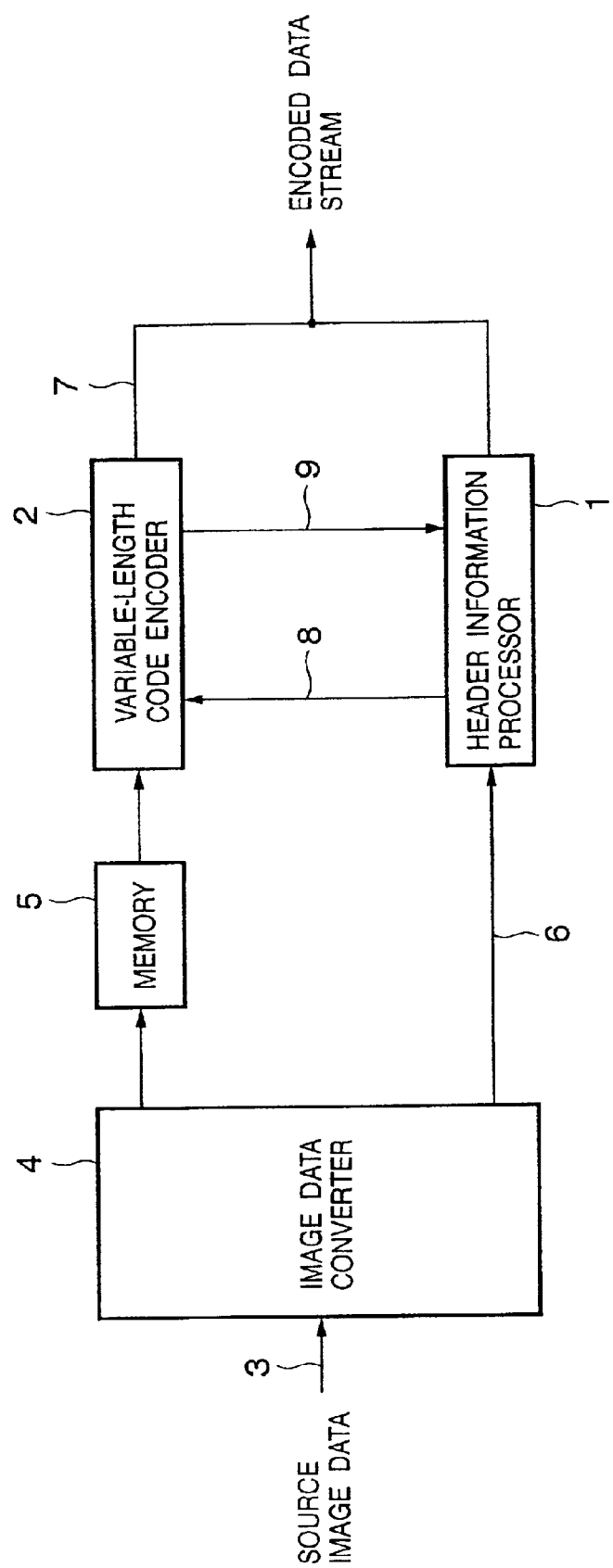
FIG. 1 is a functional block diagram showing an embodiment of an image encoding apparatus to which the present invention is applied.

The first embodiment of the present invention will be described below with reference to the accompanying drawings. FIG. 1 is a functional block diagram showing an embodiment of an image encoding apparatus to which the present invention is applied. Referring to FIG. 1, reference numeral 1 denotes a header information processor; 2, a variable-length code encoder; 3, a source image data input signal; 4, an image data converter; 5, a memory; 6, an encoding parameter signal; 7, an encoded data stream output signal; 8, an operation start command signal; and 9, an operation end message signal.

Figure 5:
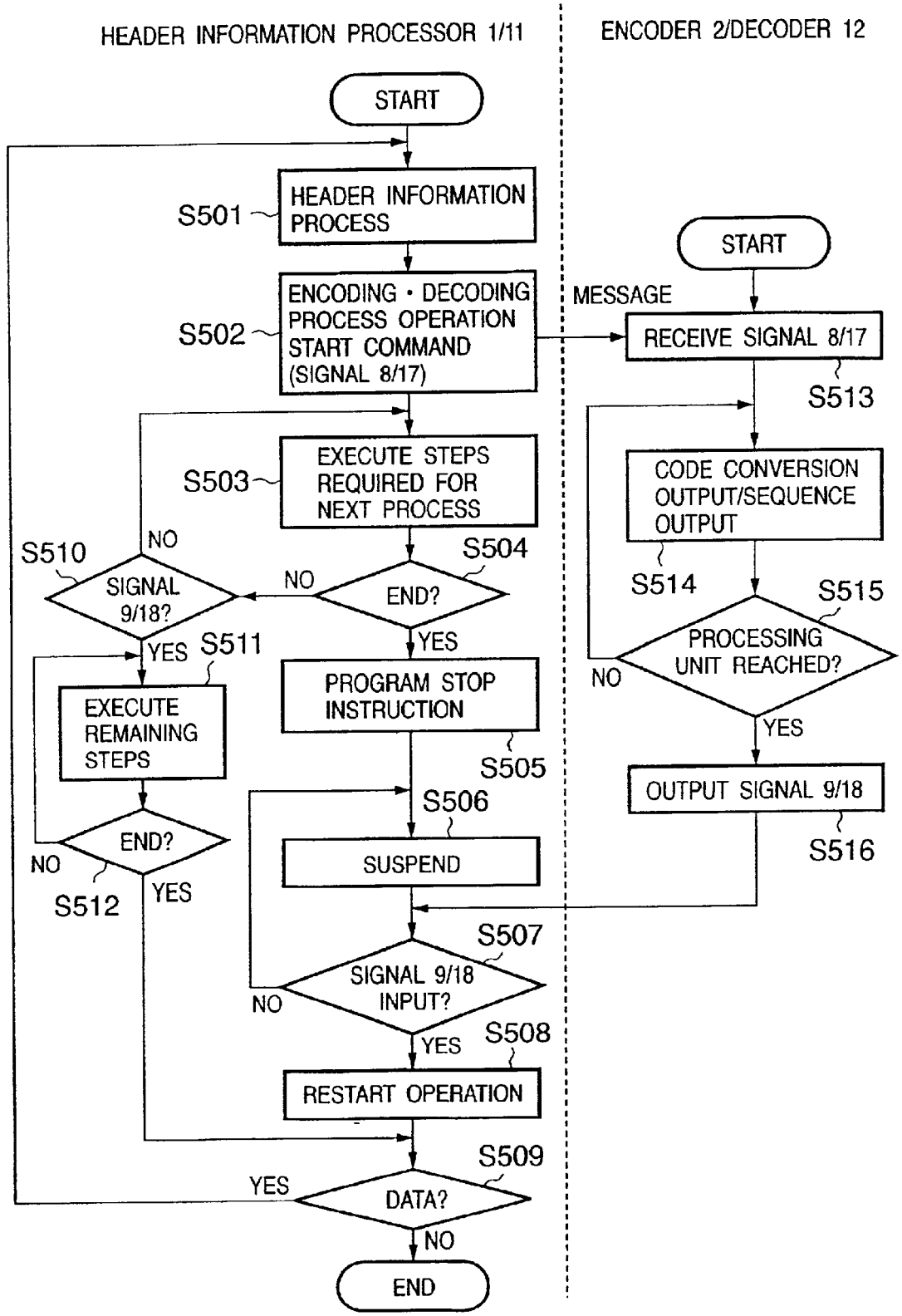
FIG. 5 is a flow chart showing the flow of the image encoding and decoding processes of the present invention.
Figure 11A:
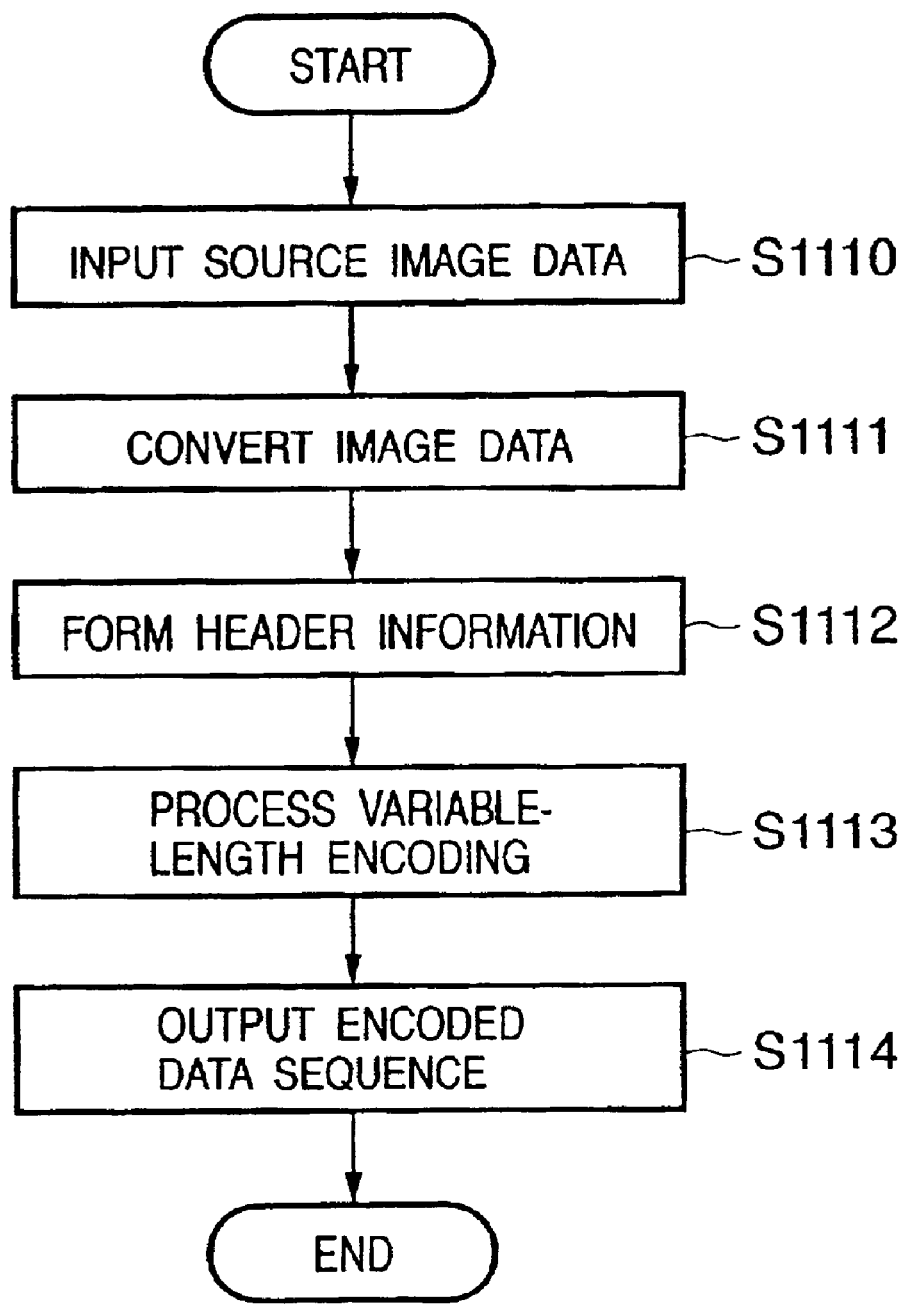
FIG. 11A is a flow chart showing an encoding process of image data according to the present invention.

Furthermore, FIG. 3 is a timing chart showing the operation sequence associated with the header information processor 1 and variable length code encoder 2 in the embodiment of the image encoding apparatus shown in FIG. 1. FIG. 5 is a flow chart showing the operation sequence. FIG. 11A is a flow chart showing an encoding process of the present invention. The operation mode in the embodiment of the image encoding apparatus and, mainly, a series of operations associated with the compression encoding process, especially, the operation state switching timing between the header information processor 1 and variable-length code encoder 2 will be explained below using FIGS. 1, 3, 5, and 11A.

Source image data input via the source image data input signal 3 (S1110) is broken up into rectangular blocks each having a predetermined size by the image data converter 4, which executes orthogonal transformation arithmetic operations for respective blocks, and arranges orthogonal transformation coefficients obtained as the arithmetic operation results in a series of data in a predetermined order. The orthogonal transformation coefficients undergo scalar quantization using a quantization step value, which is designated separately, and are converted into a series of orthogonal transformation coefficient sequences expressed by a combination of a runlength, which indicates a series of insignificant coefficients having a value "0" of the quantized orthogonal transformation coefficients, and significant coefficients having values other than "0" (S1111).

The series of orthogonal transformation coefficient sequences, which are generated by the image data converter 4 and express image data for respective rectangular blocks, are sequentially stored in the memory 5. Encoding parameters such as the quantization step value and the like, which are used in the transformation process of image data in the image data converter 4, are sequentially read out by the header information processor 1 via the encoding parameter signal 6.

The header information processor 1 reads out the encoding parameters from the image data converter 4 by its internal program via the encoding parameter signal 6, forms header information to be contained in an encoded data stream, and outputs that header information to the encoded data stream output signal 7 (t1–t2, S501, S1112).

When the next code to be arranged in the output encoded data stream is a series of a plurality of variable-length codes obtained by encoding image information, i.e., a series of orthogonal transformation coefficient sequences generated by the image data converter 4, the header information processor 1 issues an operation start command of an encoding process for a predetermined processing unit (e.g., a macroblock) to the variable-length code encoder 2 (t2, S502). The operation start command of the encoding process issued by the header information processor 1 is sent to the variable-length code encoder 2 via the dedicated operation start command signal 8 (t2).

Upon receiving the operation start command of the encoding process via the operation start command signal 8, the variable-length code encoder 2 sequentially reads out a series of orthogonal transformation coefficient sequences from the memory 5, sequentially converts respective transformation coefficient sequences into corresponding variable-length codes by looking up a variable-length code table, which is separately specified (S1113), and outputs a series of a plurality of variable-length codes obtained as a result to the encoded data stream output signal 7 (t2–t4, S514, S1114).

If the number of data of the series of converted orthogonal transformation coefficient sequences has reached a processing unit (S515), the variable-length code encoder 2 stops the read-out operation of the orthogonal transformation coefficient sequences from the memory 5, and outputs the operation end message signal 9 to the header information processor 1 to inform it of the end of encoding process for the current processing unit (t4, S516).

On the other hand, if the header information processor 1 has completed execution steps (S503, S504) required for the encoding process of the next processing unit after it issuing the operation start command of the encoding process to the variable-length code encoder 2, it issues an instruction for quickly entering a program inactive state (t3, S505). The program inactive state is generally called a suspend state. In the program inactive state, all state machines in the header information processor 1 are inactivated, and externally supplied operation clocks are also stopped (S506). Hence, the amount of electric power consumed by the header information processor 1 in the program inactive state is very small.

The header information processor 1 in the program inactive state can resume a normal program active state in response to an externally applied resume event input (S507). In this embodiment, the operation end message signal 9 output from the variable-length code encoder 2 is connected to the header information processor 1 as one of resume event input signals.

Upon detecting the operation end message signal 9 which was issued from the variable-length code encoder 2 to the header information processor 1 to inform it of the end of encoding process for the current processing unit, the header information processor 1 receives operation clocks again, and internal state machines start their operations, thus consequently restarting the operation of the program on the header information processor 1 (t4, S508). The header information processor 1 which has restarted its program operation forms header information associated with the next processing unit (S509), and outputs the obtained header information to the encoded data stream output signal 7 (t4–t5). After that, the header information processor 1 issues an operation start command of an encoding process for the next processing unit to the variable-length code encoder 2.

Since there are few processes required for the encoding process for the next processing unit after the header information processor 1 issued the operation start command of an encoding process to the variable-length code encoder 2 (t2), the header information processor 1 enters a program inactive state with a small time gap (t3, S506). However, if the next processing unit is located at a hierarchically special position of a syntax, e.g., a slice boundary (MPEG coding) or a restart interval boundary (JPEG coding), the number of execution steps required for the encoding process of the next processing unit is relatively large.

FIG. 3 also depicts such case. More specifically, as shown in FIG. 3, when the next processing unit is the last macroblock of a slice in MPEG coding, the interval (t6–t7) between the timing (t6) at which the header information processor 1 issues an operation start command of an encoding process for the next processing unit to the variable-length code encoder 2 and the timing (t7) at which the header information processor 1 issues an instruction for entering a program inactive state is longer than other cases.

Figure 4A:
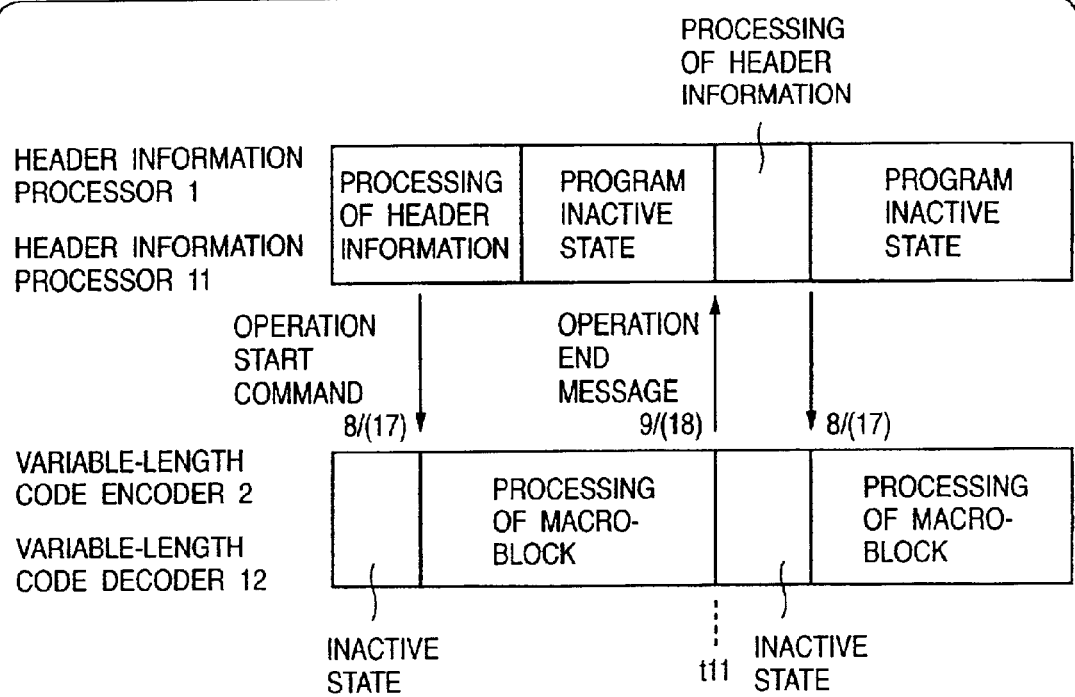
FIG. 4A is a second timing chart showing the operation mode of the image encoding and decoding apparatuses of the present invention.
Figure 4B:
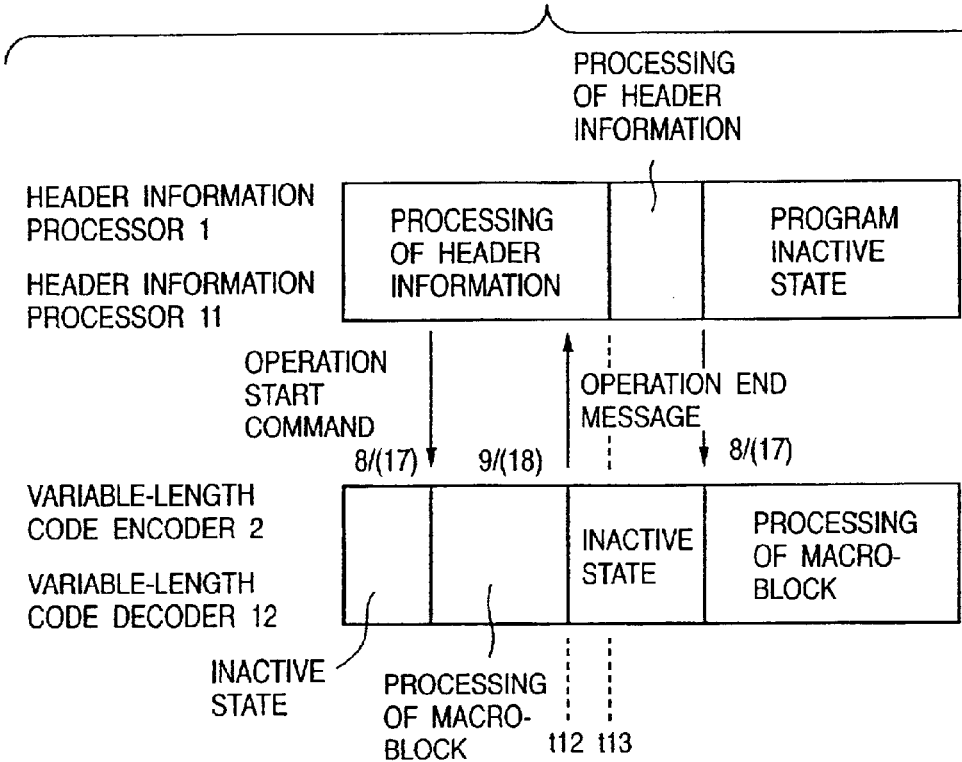
FIG. 4B is a third timing chart showing the operation mode of the image encoding and decoding apparatuses of the present invention.

FIGS. 4A and 4B are timing charts showing the operation switching sequence between the header information processor 1 and variable-length code encoder 2 in the embodiment of the image encoding apparatus shown in FIG. 1. FIG. 4A shows a case wherein the header information processor 1 has already entered the program inactive state at the timing (t11) at which the variable-length code encoder 2 issues an encoding process end message for the current processing unit (S507). In such case, as described above, the header information processor 1 quickly resumes the program active state in response to the operation end message signal 9 (t11, S508).

On the other hand, FIG. 4B shows a case wherein the header information processor 1 is in the program active state at the timing (t12) at which the variable-length code encoder 2 issues an encoding process end message for the current processing unit (S510). In this case, the header information processor 1 issues an instruction for entering a program inactive state when it has completed execution steps to be executed (t13). However, since the header information processor 1 has already received a resume event (t12), it executes an instruction after the instruction for entering the program inactive state without entering the program inactive state (S511, S512).

As described above, in the embodiment of the image encoding apparatus, the header information processor 1, which issued an operation start command of an encoding process for a given processing unit to the variable-length code encoder 2, can advance execution steps which are required for the encoding process of the next processing unit, for the purpose of shortening the subsequent processing time. Furthermore, if the header information processor 1 has completed the required execution steps, it can enter a program inactive state anytime so as to reduce consumption power.

If the variable-length code encoder 2 has already completed an encoding process for the current processing unit at the transition timing to the program inactive state, the header information processor 1 executes the program without entering the program inactive state. Hence, no extra overhead is produced.

[Second Embodiment]

Figure 2:
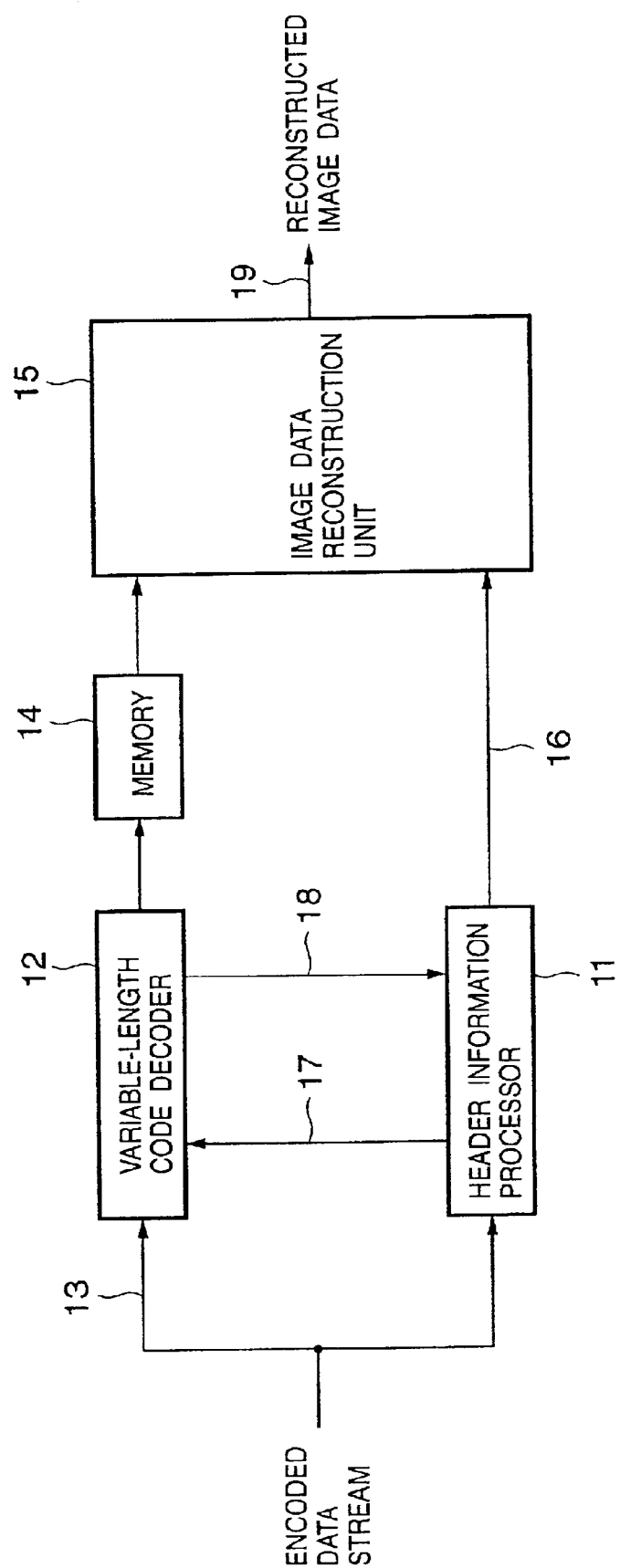
FIG. 2 is a functional block diagram showing an embodiment of an image decoding apparatus to which the present invention is applied.
Figure 11B:
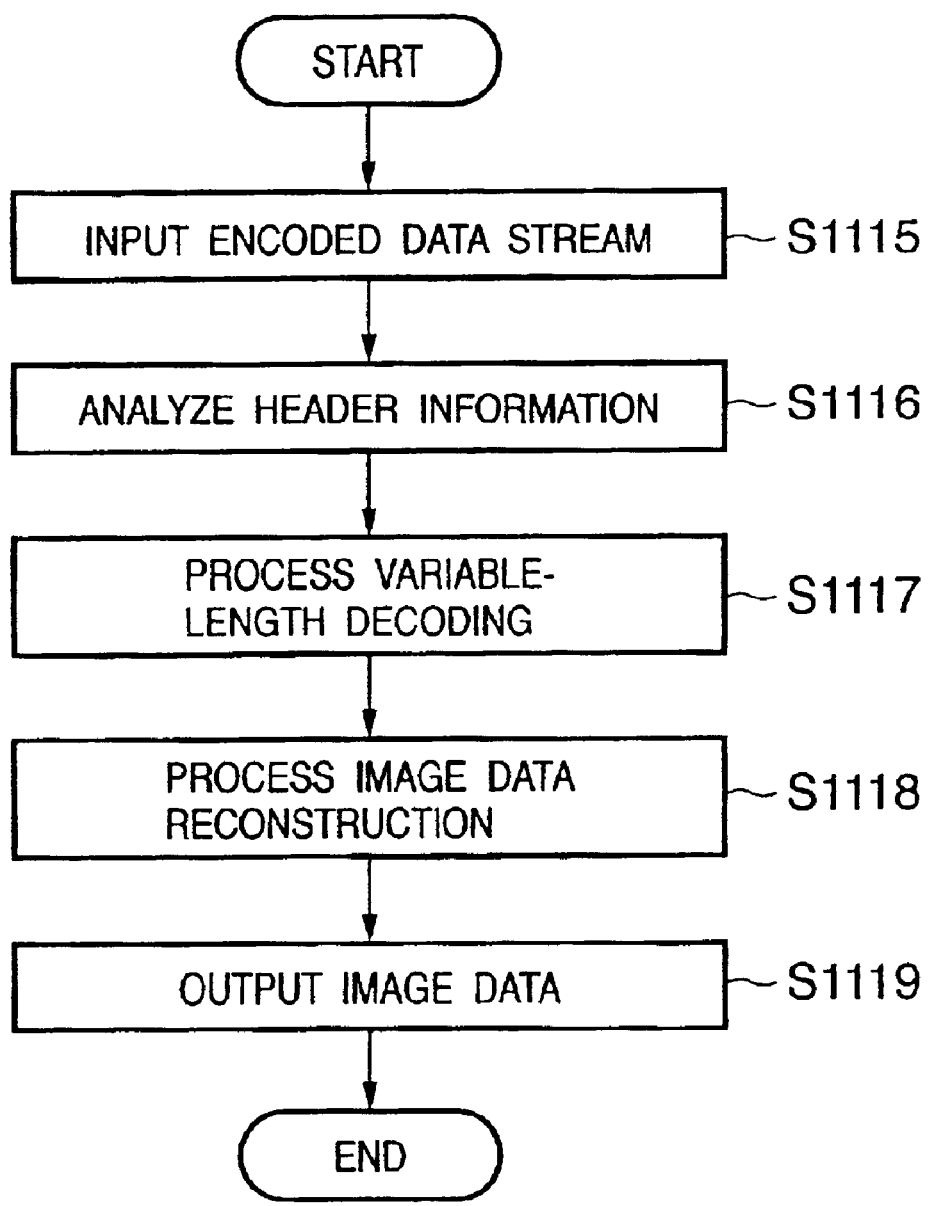
FIG. 11B is a flow chart showing a decoding process of image data according to the present invention.

FIG. 2 is a functional block diagram of an image decoding apparatus according to the second embodiment of the present invention. Referring to FIG. 2, reference numeral 11 denotes a header information processor; 12, a variable-length code decoder; 13, an encoded data stream input signal; 14, a memory; 15, an image data reconstruction unit; 16, an encoding parameter signal; 17, an operation start command signal; 18, an operation end message signal; and 19, a reconstructed image data output signal. Furthermore, FIG. 3 is a timing chart showing the operation sequence associated with the header information processor 11 and variable-length code decoder 12 in the embodiment of the image decoding apparatus shown in FIG. 2. FIG. 11B is a flow chart showing the decoding process of the present invention.

The operation mode in the embodiment of the image decoding apparatus and, mainly, a series of operations associated with the decompression decoding process, especially, the operation state switching timing between the header information processor 11 and variable-length code decoder 12 will be explained below using FIGS. 2, 3, 5, and 11B.

An encoded data stream input via the encoded data stream input signal 13 (S1115) is supplied to both the header information processor 11 and variable-length code decoder 12. The header information processor 11 reads out header information contained in the encoded data stream from the encoded data stream input signal 13 by its internal program, and outputs encoding parameters obtained by analyzing the contents of the header information to the image data reconstruction unit 15 via the encoding parameter signal 16 (t1–t2, S501, S1116).

If the next code in the input encoded data stream is image information, i.e., a series of a plurality of variable-length codes obtained by encoding a series of orthogonal transformation coefficient sequences, the header information processor 11 issues an operation start command of a decoding process for a predetermined processing unit (e.g., a macroblock) to the variable-length code decoder 12 (t2, S502).

The operation start command of the decoding process issued by the header information processor 11 is sent to the variable-length code decoder 12 via the dedicated operation start command signal 17 (t2, S502). Upon receiving the operation start command of the decoding process, the variable-length code decoder 12 sequentially reads out a series of a plurality of variable-length codes from the encoded data stream input signal 13, sequentially converts respective variable-length codes into corresponding orthogonal transformation coefficient sequences by looking up a variable-length code table, which is separately specified, and outputs a series of orthogonal transformation coefficient sequences obtained as a result to the memory 14 (t2–t4, S514, S1117).

The image data reconstruction unit 15 sequentially reads out the series of orthogonal transformation coefficient sequences, which are stored in the memory 14 and express image data for each rectangular block. Encoding parameters such as the quantization step value and the like, which were used in the image data conversion process, are sequentially supplied from the header information processor 11 to the image data reconstruction unit 15 via the encoding parameter signal 16.

Significant coefficients contained in the series of orthogonal transformation coefficient sequences read out from the memory 14 undergo scalar dequantization using the quantization step value, which is designated independently to restore orthogonal transformation coefficients, which were arranged in a series of data in a predetermined order, to a two-dimensional arrangement. After that, the orthogonal transformation coefficients for that block undergo inverse orthogonal transformation arithmetic operations to transform to reconstructed image data of the rectangular block (S1118), and finally reconstructed image data is output via the reconstructed image data output signal 19 (S1119).

If the number of data of the series of converted orthogonal transformation coefficient sequences has reached a given processing unit (S515), the variable-length code decoder 12 stops the read-out operation of variable-length codes from the encoded data stream input signal 13, and outputs the operation end message signal 18 to the header information processor 11 to inform it of the end of the decoding process for the current processing unit (t4, S516). On the other hand, if the header information processor 11 has completed execution steps required for a decoding process of the next processing unit after it issued the operation start command of the decoding process to the variable-length code decoder 12, it issues an instruction for quickly entering a program inactive state (t3, S505).

The program inactive state is generally called a suspend state. In the program inactive state, all state machines in the header information processor 11 are inactivated, and externally supplied operation clocks are also stopped (S506). Hence, electric power consumed by the header information processor 11 in the program inactive state is very small. The header information processor 11 in the program inactive state can resume a normal program active state in response to an externally applied resume event input.

In this embodiment, the operation end message signal 18 output from the variable-length-code decoder 12 is connected to the header information processor 11 as one of resume event input signals. Upon detecting the operation end message signal 18 which was issued from the variable-length code decoder 12 to the header information processor 11 to inform it of the end of decoding process for the current processing unit (S507), the header information processor 11 receives operation clocks again, and internal state machines start their operations, thus consequently restarting the operation of the program on the header information processor 11 (t4, S508).

The header information processor 11 that has restarted its program operation reads out the subsequent header information from the encoded data stream input signal 13, and outputs encoding parameters associated with the next processing unit to the encoding parameter signal 16 (t4–t5, S501). After that, the header information processor 11 issues an operation start command of a decoding process for the next processing unit to the variable-length code decoder 12 (t5, S502).

Since there are few processes required for the decoding process for the next processing unit after the header information processor 11 issued the operation start command of the decoding process to the variable-length code decoder 12 (t2, S502), the header information processor 11 enters a program inactive state with a small time gap (t3). However, if the next processing unit is located at a hierarchically special position of a syntax, e.g., a slice boundary (MPEG coding) or a restart interval boundary (JPEG coding), or when various compensation operations of code errors detected from the encoded data stream are required, the number of execution steps required for the decoding process of the next processing unit is relatively large.

FIG. 3 also depicts such case. More specifically, as shown in FIG. 3, when the next processing unit is the last macroblock of a slice in MPEG coding, the interval (t6–t7) between the timing (t6) at which the header information processor 11 issues an operation start command of a decoding process for the next processing unit to the variable-length code decoder 12 and the timing (t7) at which the header information processor 11 issues an instruction for entering a program inactive state is longer than other cases.

FIGS. 4A and 4B are timing charts showing the operation switching sequence between the header information processor 11 and variable-length code decoder 12 in the embodiment of the image decoding apparatus shown in FIG. 2. FIG. 4A shows a case wherein the header information processor 11 has already entered the program inactive state at the timing (t11) at which the variable-length code decoder 2 issues a decoding process end message for the current processing unit (S507).

In such case, as described above, the header information processor 11 quickly resumes the program active state in response to the operation end message signal 18 (t11, S508). On the other hand, FIG. 4B shows a case wherein the header information processor 11 is in the program active state at the timing (t12) at which the variable-length code decoder 12 issues an encoding process end message for the current processing unit (S510).

In this case, the header information processor 11 issues an instruction for entering a program inactive state when it has completed execution steps to be executed (t13). However, since the header information processor 11 has already received a resume event (t12), it executes an instruction after the instruction for entering the program inactive state without entering the program inactive state (S511, S512, S509).

As described above, in the embodiment of the image decoding apparatus, the header information processor 11, which issued an operation start command of a decoding process for a given processing unit to the variable-length code decoder 12, can advance execution steps which are required for the decoding process of the next processing unit, for the purpose of shortening the subsequent processing time. Furthermore, if the header information processor 11 has completed the required execution steps, it can enter a program inactive state anytime so as to reduce consumption power.

If the variable-length code decoder 12 has completed the decoding process for the current processing unit at the transition timing to the program inactive state, the header information processor 11 can proceed to execute the program without entering the program inactive state, thus preventing any extra overhead from being generated.

As described above, in the present invention, in an arrangement in which a processor (header information processors 1 and 11) that exclusively processes header information and a processor (variable-length code encoder 2 and decoder 12) that exclusively processes image information are operated in collaboration with each other so as to process (encode or decode) a general encoded data stream which includes both fixed- and variable-length codes at high speed, whether to operate the two processors simultaneously or to inactivate the processor that exclusively processes header information to suppress consumption power is adaptively freely selectable.

Since interrupt operations are omitted, extra overhead can be prevented, thus improving processing efficiency.

Accordingly, since the encoding and decoding processing apparatuses to which the present invention is applied can flexibly operate in the system, these apparatuses can satisfy requirements for both a system that requires high processing performance and that which requires low consumption power.

[Third Embodiment]

Figure 6:
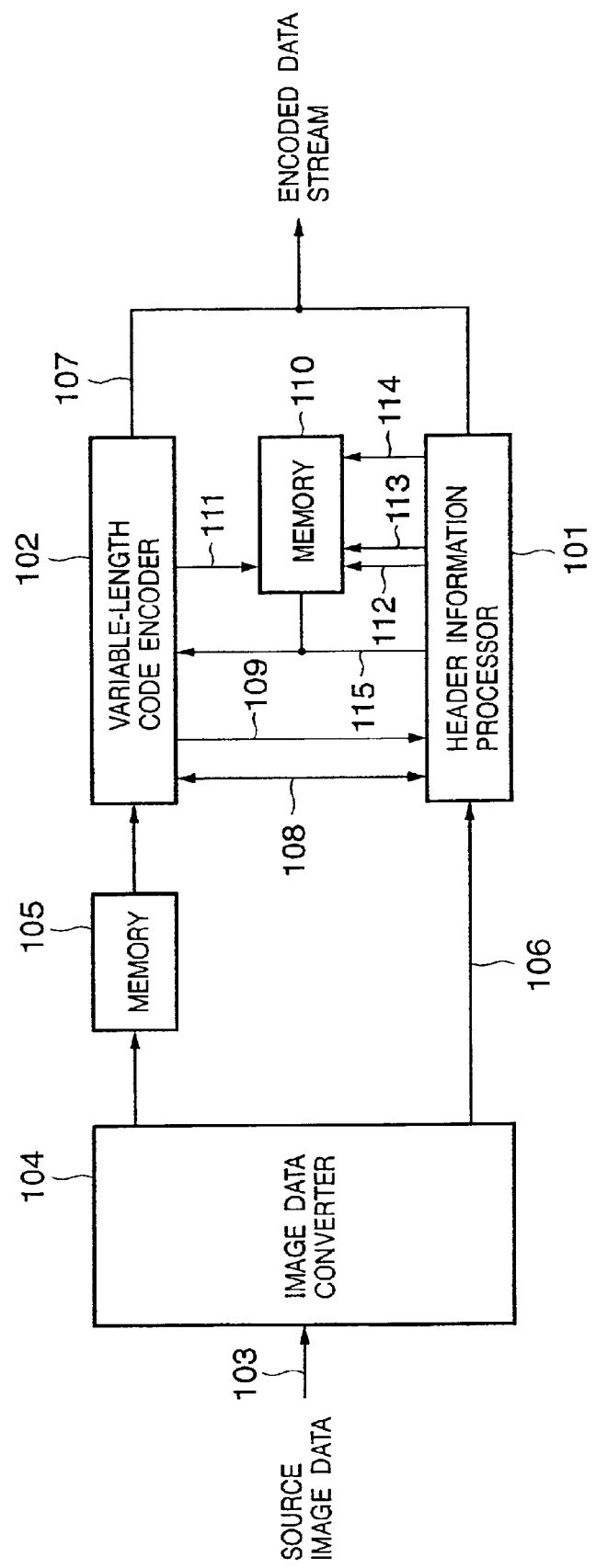
FIG. 6 is a functional block diagram showing an embodiment of an image encoding apparatus according to the present invention.

The third embodiment of the present invention will be described below with reference to the accompanying drawings. FIG. 6 is a functional block diagram showing an embodiment of an image encoding apparatus to which the present invention is applied. Referring to FIG. 6, reference numeral 101 denotes a header information processor which operates according to program descriptions and comprises a versatile microprocessor; 102, a variable-length code encoder; 103, a source image data input signal; 104, an image data converter; 105, a memory; 106, an encoding parameter signal; 107, an encoded data stream output signal; 108, an operation start command signal; 109, an operation end message signal; 110, a memory; 111, an address signal output from the variable-length code encoder 102 to the memory 110; 112, an address signal output from the header information processor 101 to the memory 110; 113, a write data signal line to the memory 110; 114, a control signal line to the memory 110; and 115, a readout data signal line to the header information processor 101 and the variable-length code encoder 102.

Figure 8:
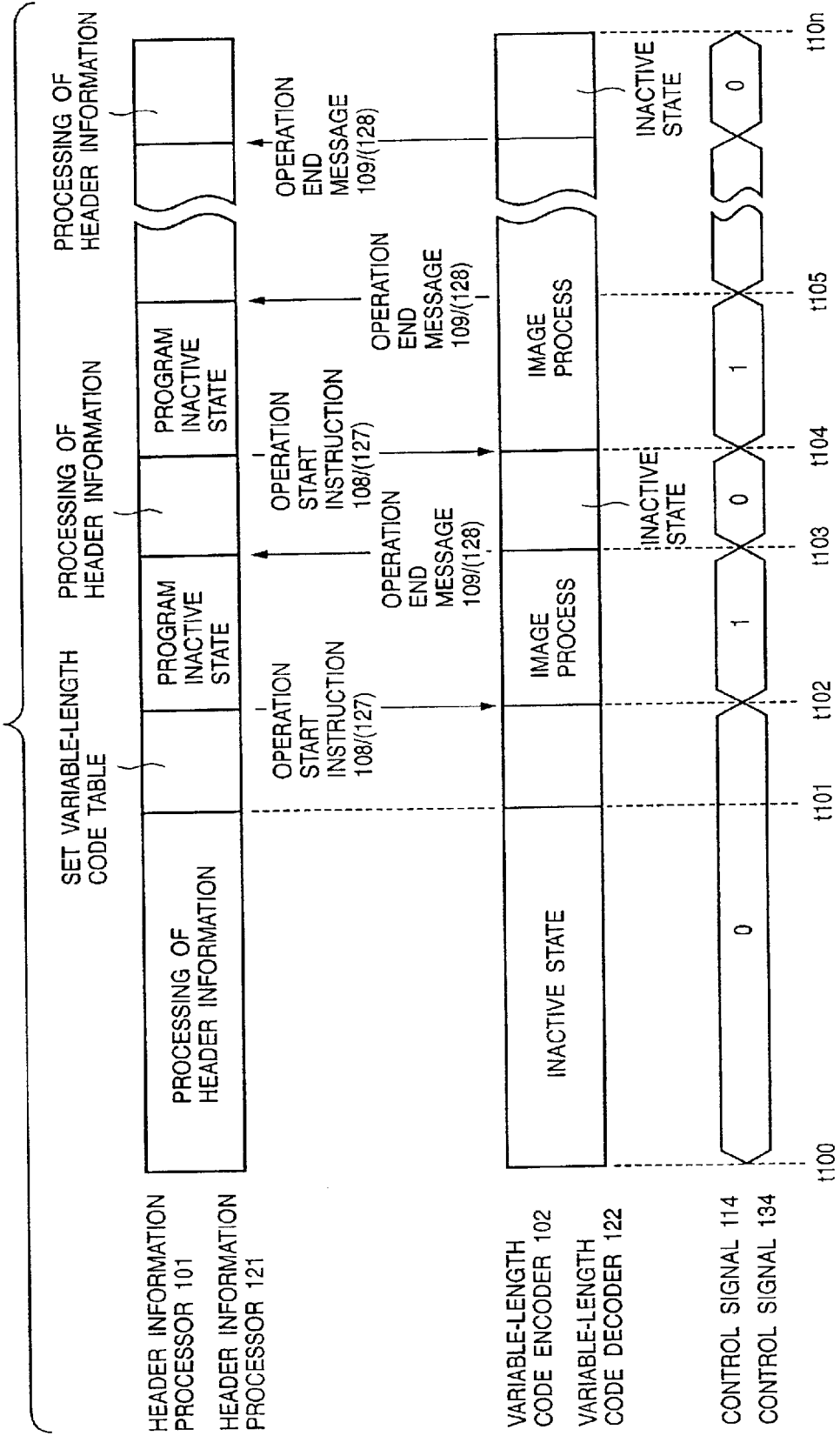
FIG. 8 is a timing chart showing the operation mode of the image encoding and decoding apparatuses of the present invention.
Figure 9:
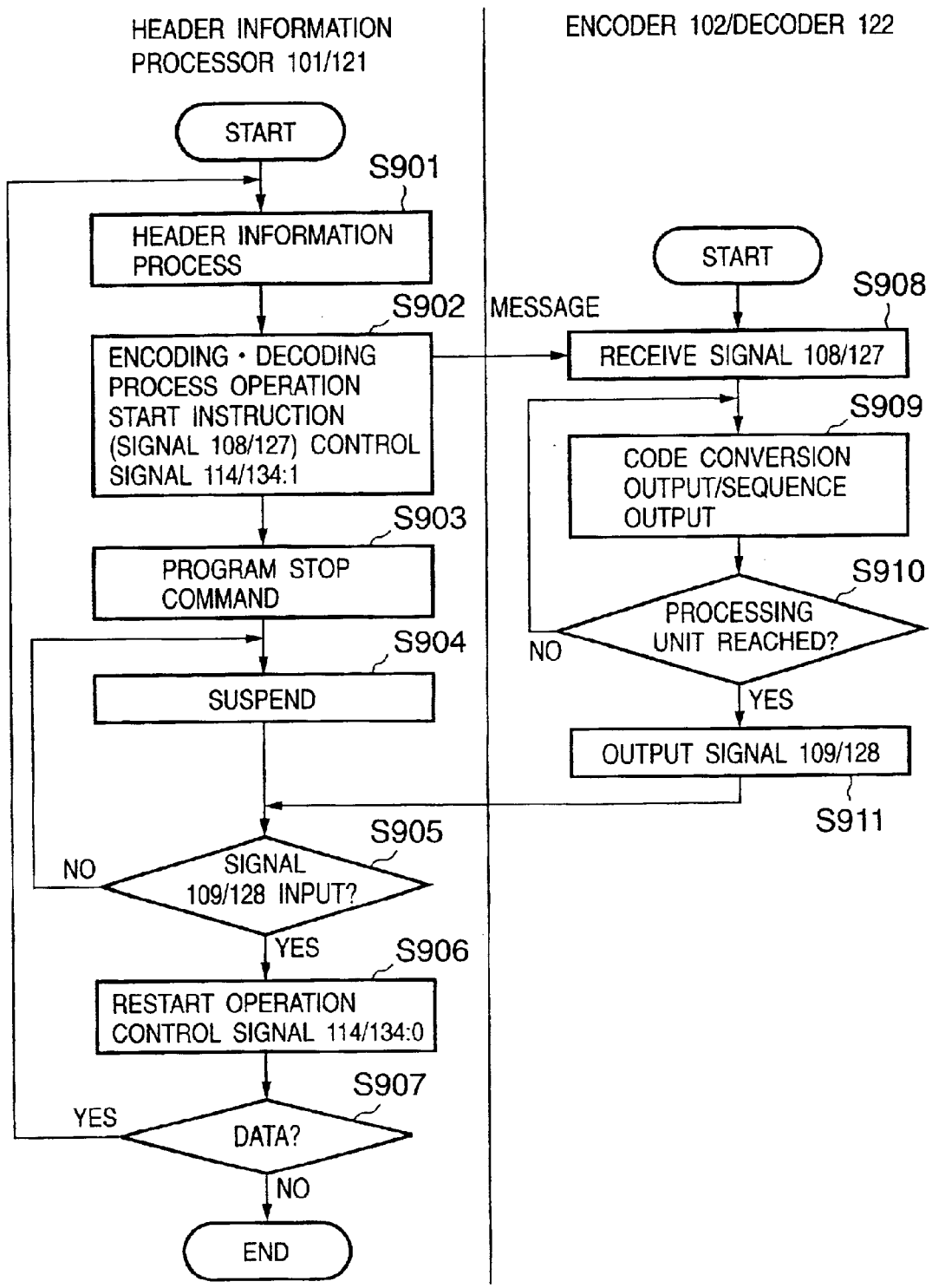
FIG. 9 is a flow chart showing the flow of the image encoding and decoding processes of the present invention.
Figure 10A:
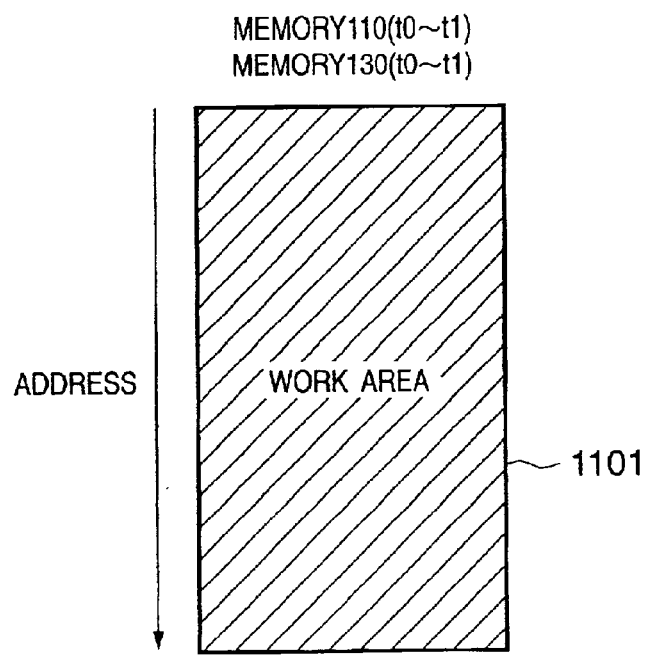
FIG. 10A is a memory map showing the use states of memories 110 and 130 of the present invention.
Figure 10B:
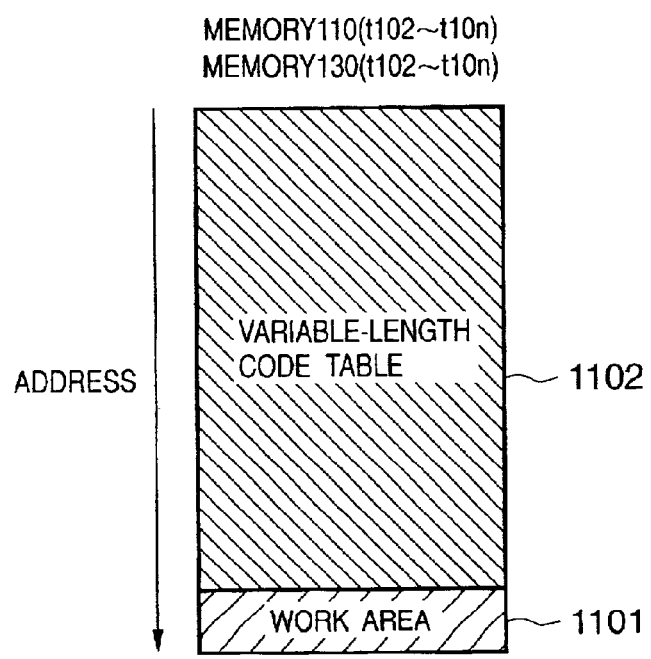
FIG. 10B is a memory map showing the use states of the memories 110 and 130 of the present invention.
Figure 12:
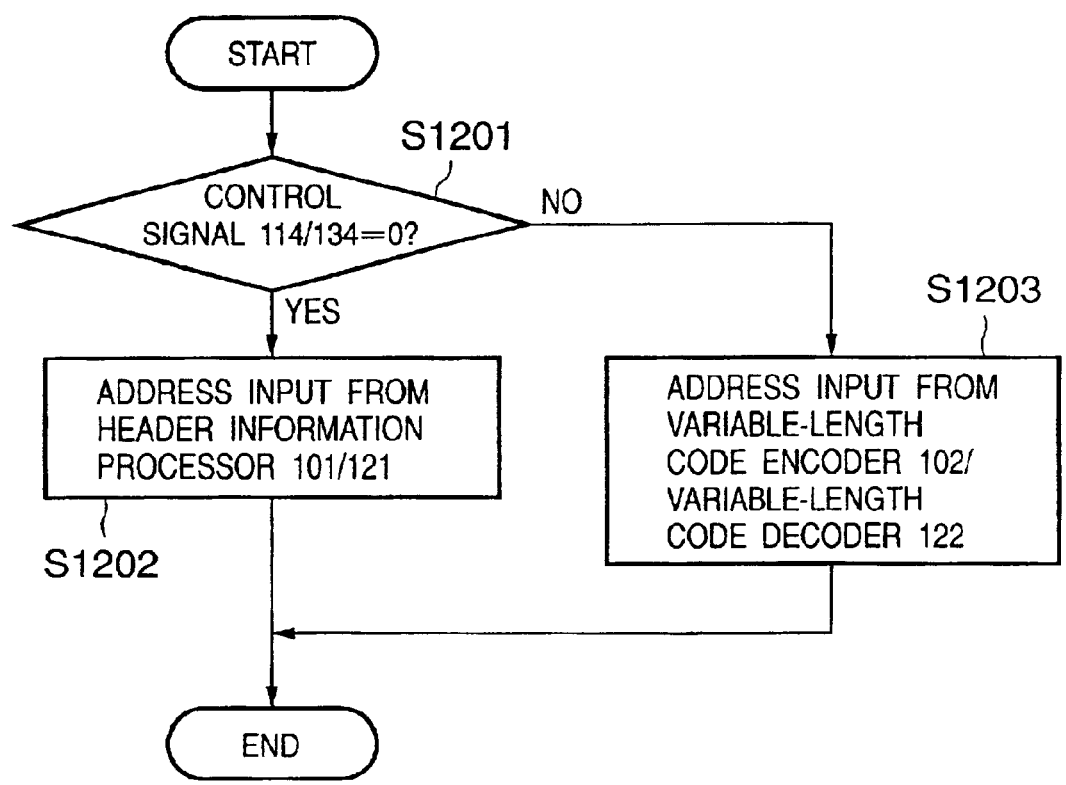
FIG. 12 is a flow chart showing an input control process of address information to the memories 110 and 130 in the embodiment of the present invention.

Furthermore, FIG. 8 is a timing chart showing the operation sequence associated with the header information processor 101 and variable length code encoder 102 in the embodiment of the image encoding apparatus shown in FIG. 6. FIG. 9 is a flow chart showing the operation sequence. FIGS. 10A and 10B are memory maps showing the use state of the memory 110. FIG. 11A is a flow chart showing an encoding process of the present invention. FIG. 12 is a flow chart showing an address input control process to the memory in the embodiment of the present invention.

The operation mode in the embodiment of the image encoding apparatus and, mainly, a series of operations associated with the compression encoding process, especially, the operation state switching timing between the header information processor 101 and variable-length code encoder 102 will be explained below using FIGS. 6, 8, 9, 10A, 10B, 11A, and 12.

Source image data input via the source image data input signal 103 (S1110) is broken up into rectangular blocks each having a predetermined size by the image data converter 104, which executes orthogonal transformation arithmetic operations for respective blocks, and arranges orthogonal transformation coefficients obtained as the arithmetic operation results in a series of data in a predetermined order. The orthogonal transformation coefficients undergo scalar quantization using a quantization step value, which is designated independently, and are converted into a series of orthogonal transformation coefficient sequences expressed by a combination of a run-length, which indicates a series of insignificant coefficients having a value "0" of the quantized orthogonal transformation coefficients, and significant coefficients having values other than "0" (S1111).

The series of orthogonal transformation coefficient sequences, which are generated by the image data converter 104 and express image data for respective rectangular blocks, are sequentially stored in the memory 105. Encoding parameters such as the quantization step value and the like, which are used in the transformation process of image data in the image data converter 104, are sequentially read out by the header information processor 101 via the encoding parameter signal 106.

The header information processor 101 outputs '0' to the control signal 114 to select the address signal 112 generated by the header information processor 101 as an address signal to the memory 110 (t100). From this moment, until the value of the control signal 114 is changed (t100–t102), the memory 110 is exclusively used by the header information processor 110 (S1201, S1202). The header information processor 101 uses the memory 110 as a randomly accessible work area, and stores constants to be used frequently and variables to be used temporarily. In particular, as shown in FIG. 10A, the entire area of the memory 110 can be used as the work area of the header information processor 101 before a variable-length code table is set in the memory 110 (t100–t101).

The header information processor 101 reads out the encoding parameters from the image data converter 104 by its internal program via the encoding parameter signal 106, forms header information to be contained in an encoded data stream, and outputs that header information to the encoded data stream output signal 107 (t101–t102, S901, S1112).

Upon completion of output of the header information to the encoded data stream output signal 107 (t101), the header information processor 101 sets a variable-length code table in the memory 110 via the write data signal line 113 on the basis of the encoding parameters (t101–t102). Since the memory 110 is exclusively used by the header information processor 101, one element of the variable-length code table can be written in a unit time required for the write operation of the memory 110. As shown in FIG. 10B, after the variable-length code table is set in the memory 110, most of the area of the memory 110 is occupied by the variable-length code table (t102–t10n). Although the work area that the header information processor 101 can use becomes small, since the header information formation process nearly comes to an end, it suffices to execute the subsequent header information process.

When the next code to be arranged in the output encoded data stream is a series of a plurality of variable-length codes obtained by encoding image information, i.e., a series of orthogonal transformation coefficient sequences generated by the image data converter 104, the header information processor 101 outputs '1' to the control signal 114 to select the address signal 111 generated by the variable-length code encoder 102 as an address signal to the memory 110 (t102). From this moment, until the value of the control signal 114 is changed, the memory 110 is exclusively used by the variable-length code encoder 102 to look up the variable-length code table (t102–t103, S1201, S1203).

Furthermore, the header information processor 101 issues an operation start command of an encoding process for a predetermined processing unit (e.g., a processing unit in which a restart marker is inserted) to the variable-length code encoder 102 (t102, S902). The operation start command of the encoding process issued by the header information processor 101 is sent to the variable-length code encoder 102 via the dedicated operation start command signal 108 (t102, S902).

Variable-length code encoder 102 comprises an address generation component, a connection component and a control component. The address generation component generates an address for the memory 110 and outputs the generated address to the memory 110. The connection unit connects the output variable-length code data from the memory 110 with the time series and generates a coded data stream. The control component controls the address generation component and the connection component.

The memory 110 stores the variable-length codes corresponding to the run-length codes that are elements of the orthogonal transformation coefficient sequences in the memory 105 and are used as the address signal of the memory 110. The control component controls the address generation component to output the input run-length codes from the memory 105 as address signal 111, after reception of the operation start command signal 108. The connection component temporarily stores variable-length code with arbitrary bit length that is input sequentially from the memory 110 via the readout data signal 115, and in tandem with the time series outputs to a later stage when a certain unit amount consisting of several bytes is attained.

When completion of the processing predetermined processing unit is detected, the control component stop the operation of the address generation component and the connection component and notifies the header information processor 101 of the completion of processing by the operation end message signal 109.

Upon receiving the operation start command of the encoding process via the operation start command signal 108 (S908), the variable-length code encoder 102 sequentially reads out a series of orthogonal transformation coefficient sequences from the memory 105, sequentially converts respective transformation coefficient sequences into corresponding variable-length codes by looking up the variable-length code table, which is separately specified in the memory 110 (S1113), and outputs a series of a plurality of variable-length codes obtained as a result to the encoded data stream output signal 107 (t102–t103, S909, S1114).

If the number of data of the series of converted orthogonal transformation coefficient sequences has reached a processing unit (S910), the variable-length code encoder 102 stops the read-out operation of the orthogonal transformation coefficient sequences from the memory 105, and outputs the operation end message signal 109 to the header information processor 101 to inform it of the end of encoding process for the current processing unit (t103, S911).

On the other hand, after the header information processor 101 issued the operation start command of the encoding process to the variable-length code encoder 102, it issues a command for quickly entering a program inactive state (t102, S903). The program inactive state is generally called a suspend state. In the program inactive state, all state machines in the header information processor 101 are inactivated, and externally supplied operation clocks are also stopped (S904). Hence, electric power consumed by the header information processor 101 in the program inactive state is very small.

The header information processor 101 in the program inactive state can resume a normal program active state in response to an externally applied resume event input (S905). In this embodiment, the operation end message signal 109 output from the variable-length code encoder 102 is connected to the header information processor 101 as one of resume event input signals.

Upon detecting the operation end message signal 109 which was issued from the variable-length code encoder 102 to the header information processor 101 to inform it of the end of encoding process for the current processing unit, the header information processor 101 receives operation clocks again, and internal state machines start their operations, thus consequently restarting the operation of the program on the header information processor 101 (t103, S906).

The header information processor 101 outputs '0' to the control signal 114 to select the address signal 112 generated by the header information processor 101 as an address signal to the memory 110 (t103). From this moment, until the value of the control signal 114 is changed (t103–t104), the memory 110 is exclusively used by the header information processor 110 (S1201, S1202). If orthogonal transformation coefficient sequence data to be processed still remain (S907), the header information processor 101 that has restarted its program operation forms header information associated with the next processing unit, and outputs that header information to the encoded data stream output signal 107 (t103–t104, S901). After that, the header information processor 101 issues an operation start command of an encoding process for the next processing unit to the variable-length code encoder 102 (t104, S902).

Since there are few processes-required for the encoding process for the next processing unit after the header information processor 101 issued the operation start command of an encoding process to the variable-length code encoder 102 (t102, S902), the header information processor 101 enters a program inactive state with a small time gap (t102, S903). In this embodiment, the timing at which the header information processor 101 issues an operation start command of an encoding process to the variable-length code encoder 102 is simultaneous with that at which the header information processor 101 enters the program inactive state (t102). However, if the next processing unit is located at a hierarchically special position of a syntax, e.g., a slice boundary (MPEG coding) or a restart interval boundary (JPEG coding), the number of execution steps required for the encoding process of the next processing unit is relatively large.

[Fourth Embodiment]

Figure 7:
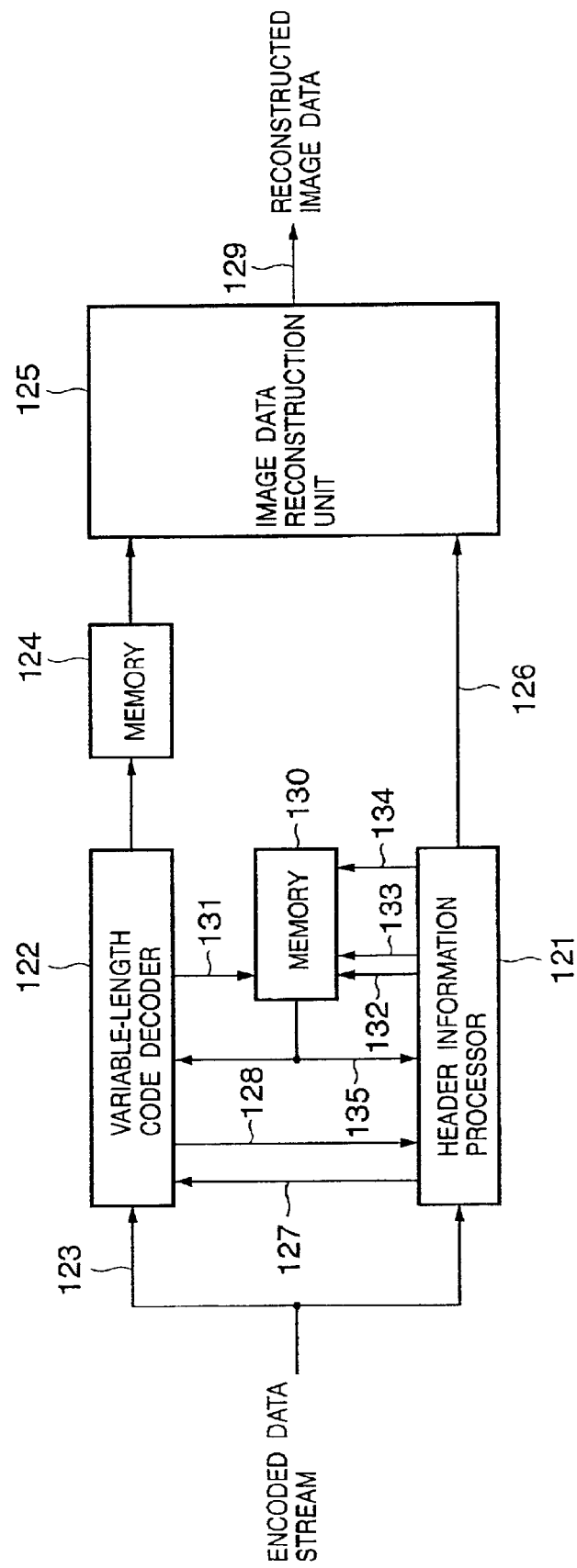
FIG. 7 is a functional block diagram showing an embodiment of an image decoding apparatus according to the present invention.

The fourth embodiment of the present invention will be described below with reference to the accompanying drawings. FIG. 7 is a functional block diagram showing an embodiment of an image decoding apparatus to which the present invention is applied. Referring to FIG. 7, reference numeral 121 denotes a header information processor which operates according to program descriptions and comprises a versatile microprocessor; 122, a variable-length code decoder; 123, an encoded data stream input signal; 124, a memory; 125, an image data reconstruction unit; 126, an encoding parameter signal; 127, an operation start command signal; 128, an operation end message signal; 129, a reconstructed image data output signal; 130, a memory; 131, an address output from the variable-length decoder 122 to the memory 130; 132, an address output from the header information processor 121 to the memory 130; 133, a write data signal line to the memory 130; 134, a control signal line to the memory 130; and 135, a readout data signal line to the header information processor 121 and the variable-length code decoder 122.

Furthermore, FIG. 8 is a timing chart showing the operation sequence associated with the header information processor 121 and variable-length code decoder 122 in the embodiment of the image decoding apparatus shown in FIG. 7. FIG. 9 is a flow chart showing the operation sequence. FIGS. 10A and 10B are memory maps that show the use state of the memory 130. FIG. 11B is a flow chart showing the decoding process of the present invention. FIG. 12 is a flow chart showing the address input control process to the memory 130 in the embodiment of the present invention.

The operation mode in the embodiment of the image decoding apparatus and, mainly, a series of operations associated with the decompression decoding process, especially the operation state switching timing between the header information processor 121 and variable-length code decoder 122, will be explained below using FIGS. 7, 8, 9, 10A, 10B, 11B, and 12.

The header information processor 121 outputs '0' to the control signal 134 to select the address signal 132 generated by the header information processor 121 as an address signal to the memory 130 (t100). From this moment, until the value of the control signal 134 is changed (t100–t102), the memory 130 is exclusively used by the header information processor 121 (S1201, S1202). The header information processor 121 uses the memory 130 as a randomly accessible work area to save register values upon calling functions in the program, and to store constants to be used frequently and variables to be used temporarily. Especially, as shown in FIG. 10A, the entire area of the memory 130 can be used as the work area of the header information processor 121 before a variable-length code table is set in the memory 130 (t100–t101).

An encoded data stream input via the encoded data stream input signal 123 (S1115) is supplied to both the header information processor 121 and variable-length code decoder 122. The header information processor 121 reads out header information contained in the encoded data stream from the encoded data stream input signal 123 by its internal program, and outputs encoding parameters obtained by analyzing the contents of the header information to the image data reconstruction unit 125 via the encoding parameter signal 126 (t100–t102, S901, S1116).

Upon completion of the analysis process of the header information in the encoded data stream (t101), the header information processor 121 sets a variable-length code table in the memory 130 via the write data signal line 133 on the basis of the acquired encoding parameters (t101–t102). Since the memory 130 is exclusively used by the header information processor 121, one element of the variable-length table can be written in a unit time required for the write operation of the memory 130. As shown in FIG. 10B, after the variable-length code table is set in the memory 130, most of the area of the memory 130 is occupied by the variable-length code table (t102–t10n). Although the work area that the header information processor 121 can use becomes small, since the header information analysis process nearly comes to an end, it suffices to execute the subsequent header information process.

If the next code in the input encoded data stream is image information, i.e., a series of a plurality of variable-length codes obtained by encoding a series of orthogonal transformation coefficient sequences, the header information processor 121 outputs '1' to the control signal 134 to select the address signal 131 generated by the variable-length code decoder 122 as an address signal to the memory 130 (t102). From this moment, until the value of the control signal 134 is changed, the memory 130 is exclusively used by the variable-length code decoder 122 to look up the variable-length code table (t102–t103, S1201, S1203). Furthermore, the header information processor 121 issues an operation start command of a decoding process for a predetermined processing unit (e.g., a processing unit in which a restart marker is inserted) to the variable-length code decoder 122 (t102, S902). The operation start command of the decoding process issued by the header information processor 121 is sent to the variable-length code decoder 122 via the dedicated operation start command signal 127 (t102, S902).

Variable-length code decoder 122 comprises an extraction component that extracts variable-length codes from the encoded data stream input through the encoded data stream input signal 123, an address generation component that converts the extracted variable-length code to address data for the memory 130 and outputs the address to the memory 130, an output component that outputs run-length code obtained from the memory 130 to a later stage, and a control component that controls the above-described components.

The memory 130 stores data as the run-length codes corresponding to values associated with the variable-length codes that are input through the encoded data stream input signal 123 to the variable-length code decoder 122 and used as the address signal of the memory 130.

The control component controls the extraction component so as to extract variable-length code from the input encoded data stream through the encoded data stream input signal 123 after reception of the operation start command signal 127. The control component also controls address generation component so as to output an address for the memory 130 through the address signal 131, wherein the address is obtained by the conversion of variable-length code from the extraction component.

The output component outputs run-length codes to a later stage through the readout data signal 135, wherein the run-length codes are input sequentially from the memory 130.

When completion of the processing of predetermined processing unit is detected, the control component stops the operation of the extraction component, the address generation component and output component and notifies the header information processor 121 of the completion of processing through the operation end message signal 128.

Upon receiving the operation start command of the decoding process from the operation start command signal 127 (S908), the variable-length code decoder 122 sequentially reads out a series of a plurality of variable-length codes from the encoded data stream input signal 123, sequentially converts respective variable-length codes into corresponding orthogonal transformation coefficient sequences by looking up the variable-length code table, which is separately specified in the memory 130, and outputs a series of orthogonal transformation coefficient sequences obtained as a result to the memory 124 (t102–t103, S909, S1117).

The image data reconstruction unit 125 sequentially reads out the series of orthogonal transformation coefficient sequences, which are stored in the memory 124 and express image data for each rectangular block. Encoding parameters such as the quantization step value and the like, which were used in the image data conversion process, are sequentially supplied from the header information processor 121 to the image data reconstruction unit 125 via the encoding parameter signal 126.

Significant coefficients contained in the series of orthogonal transformation coefficient sequences read out from the memory 124 undergo scalar dequantization using the quantization step value, which is designated independently to restore orthogonal transformation coefficients, which were arranged in a series of data in a predetermined order, to a two-dimensional arrangement. After that, the orthogonal transformation coefficients for that block undergo inverse orthogonal transformation arithmetic operations to reclaim reconstructed image data of the rectangular block (S1118), and finally reconstructed image data is output via the reconstructed image data output signal 129 (S1119).

If the number of data of the series of converted orthogonal transformation coefficient sequences has reached a given processing unit (S910), the variable-length code decoder 122 stops the read-out operation of variable-length codes from the encoded data stream input signal 123, and outputs the operation end message signal 128 to the header information processor 121 to inform it of the end of the decoding process for the current processing unit (t103, S911).

On the other hand, after the header information processor 121 issued the operation start command of the decoding process to the variable-length code decoder 122, it issues a command for quickly entering a program inactive state (t102, S903). The program inactive state is generally called a suspend state. In the program inactive state, all state machines in the header information processor 121 are inactivated, and externally supplied operation clocks are also stopped (S904). Hence, electric power consumed by the header information processor 121 in the program inactive state is very small.

The header information processor 121 in the program inactive state can resume a normal program active state in response to an externally applied resume event input (S905). In this embodiment, the operation end message signal 128 output from the variable-length code decoder 122 is connected to the header information processor 121 as one of resume event input signals.

Upon detecting the operation end message signal 128 which was issued from the variable-length code decoder 122 to the header information processor 121 to inform it of the end of decoding process for the current processing unit, the header information processor 121 receives operation clocks again, and internal state machines start their operations, thus consequently restarting the operation of the program on the header information processor 121 (t103, S906). The header information processor 121 outputs '0' to the control signal 134 to select the address signal 134 generated by the header information processor 121 as an address signal to the memory 130 (t103). From this moment, until the value of the control signal 134 is changed (t103–t104), the memory 130 is exclusively used by the header information processor 121 (S1201, S1202). If the encoded data stream to be processed still remains (S907), the header information processor 121 that has restarted its program operation reads out the subsequent header information from the encoded data stream input signal 123 to evaluate authenticity of that information (t103–t104, S901). After that, the header information processor 121 issues an operation start command of a decoding process for the next processing unit to the variable-length code decoder 122 (t104, S902).

Since there are few processes required for the decoding process for the next processing unit after the header information processor 121 issued the operation start command of the decoding process to the variable-length code decoder 122 (t102, S902), the header information processor 121 enters a program inactive state with a small time gap (t102, S903). In this embodiment, the timing at which the header information processor 121 issues an operation start command of an encoding process to the variable-length code decoder 122 is simultaneous with that at which the header information processor 121 enters the program inactive state (t102). However, if the next processing unit is located at a hierarchically special position of a syntax, e.g., a slice boundary (MPEG coding) or a restart interval boundary (JPEG coding), or when various compensation operations of code errors detected from the encoded data stream are required, the number of execution steps required for the decoding process of the next processing unit is relatively large.

As described above, in the present invention, in an arrangement in which a processor (header information processors 101 and 121) that exclusively processes header information and a processor (variable-length code encoder 102 and decoder 122) that exclusively processes image information are operated in collaboration with each other so as to process (encode or decode) a general encoded data stream which includes both fixed- and variable-length codes at high speed, since the variable-length code table to be looked up by the variable-length code encoder and decoder, and the work area used by the header information processor are stored in a single memory, the memory can be efficiently used, and the total memory size can be reduced.

Furthermore, since the number of cycles required to write an element in a variable-length table can be reduced to one, the overall processing performance can be improved.

The present invention can be applied to a system constituted by a plurality of devices (e.g., host computer, interface, reader, printer) or to an apparatus comprising a single device (e.g., copying machine, facsimile machine)

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the described embodiments and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above described embodiments are realized by executing the program codes which are read by a computer, the present invention includes a case where an OS (operating system) or the like working on the computer performs a part or entire processes in accordance with designations of the program codes and realizes functions according to the above described embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above described embodiments.

In a case where the present invention is applied to the aforesaid storage medium, the storage medium stores program codes corresponding to the flowcharts described in the embodiments.

The present invention is not limited to the above embodiments and various changes and modifications can be made within the spirit and scope of the present invention. Therefore to apprise the public of the scope of the present invention, the following claims are made.

What is claimed is:

1. An image processing method comprising:

an image data conversion step, of generating a series of orthogonal transformation coefficient sequences from input source image data;

a header information processing step, of forming header information to be contained in an encoded data stream on the basis of an encoding parameter;

a variable-length code encoding step, of generating image information consisting of a series of a plurality of variable-length codes to be contained in the encoded data stream by sequentially encoding the series of orthogonal transformation coefficient sequences;

an instruction step, of issuing an operation start command of an encoding process for the series of the plurality of variable-length codes from said header information processing step to said variable-length code encoding step;

a first control step, of controlling said header information processing step to enter an operation inactive state at a predetermined timing after the operation start command of the encoding process was issued;

a notification step, of sending an operation end message of the encoding process for the series of orthogonal transformation coefficient sequences from said variable-length code encoding step to said header information processing step; and a second control step, of controlling said header information processing step in the operation inactive state to resume an active state in response to the operation end message of the encoding process.

2. The method according to claim 1, wherein said first control step includes controlling said header information processing step to proceed to execute an operation without entering the operation inactive state when the operation end message of the encoding process is reached before said header information processing step enters the operation inactive state.

3. The method according to claim 1, wherein when said header information processing step is in the operation inactive state, internal state machines of said header information processing step are deactivated, and external clock supply is stopped.

4. A computer readable information storage medium which stores an image processing program that causes a computer to execute an image process and comprises:

code of an image data conversion step, of generating a series of orthogonal transformation coefficient sequences from input source image data;

code of a header information processing step, of forming header information to be contained in an encoded data stream on the basis of an encoding parameter;

code of a variable-length code encoding step, of generating image information consisting of a series of a plurality of variable-length codes to be contained in the encoded data stream by sequentially encoding the series of orthogonal transformation coefficient sequences;

code of an instruction step, of issuing an operation start command of an encoding process for the series of the plurality of variable-length codes from said header information processing step to said variable-length code encoding step;

code of a first control step, of controlling said header information processing step to an operation inactive state at a predetermined timing after the operation start command of the encoding process was issued;

code of a notification step, of sending an operation end message of the encoding process for the series of orthogonal transformation coefficient sequences from said variable-length code encoding step to said header information processing step; and code of a second control step, of controlling said header information processing step in the operation inactive state to resume an active state in response to the operation end message of the encoding process.

5. The medium according to claim 4, wherein said image processing program further comprises code of a step of proceeding to execute an operation without entering the operation inactive state when the operation end message of the encoding process has reached before said first control step controls said header information step to enter the operation inactive state.

6. An image processing apparatus comprising:
an image data converter, adapted to generate a series of orthogonal transformation coefficient sequences from input source image data;
a header information processor, adapted to form header information to be contained in an encoded data stream on the basis of an encoding parameter;
a variable-length code encoder, adapted to generate image information consisting of a series of a plurality of variable-length codes to be contained in the encoded data stream by sequentially encoding the series of orthogonal transformation coefficient sequences;
an instruction signal, adapted to issue an operation start command of an encoding process for the series of the plurality of variable-length codes from said header information processor to said variable-length code encoder;
a first controller, adapted to control said header information processor to enter an operation inactive state at a predetermined timing after the operation start command of the encoding process was issued;
a notification signal, adapted to send an operation end message of the encoding process for the series of orthogonal transformation coefficient sequences from the variable-length code encoder to said header information processor; and
a second controller, adapted to control said header information processor in the operation inactive state to resume an active state in response to the operation end message of the encoding process.

7. The apparatus according to claim 6, wherein when the operation end message of the encoding process is reached before said first controller controls said header information processor to enter the-operation inactive state, said first controller controls said header information processor to proceed to execute an operation without entering the operation inactive state.

8. The apparatus according to claim 6, wherein when said header information processor is in the operation inactive state, internal state machines of said header information processor are deactivated, and external clock supply is stopped.

* * * * *